United States Patent [19]

Hur et al.

[11] Patent Number: 6,141,785
[45] Date of Patent: Oct. 31, 2000

[54] ERROR CONTROL METHOD FOR MULTIPARTY MULTIMEDIA COMMUNICATIONS

[75] Inventors: Chung Ho Hur; Chong Won Park; Jin Won Park, all of Daejon, Rep. of Korea

[73] Assignee: Electronics and Telecommunications Research Institute, Daejeon, Rep. of Korea

[21] Appl. No.: 09/145,736

[22] Filed: Sep. 2, 1998

[30] Foreign Application Priority Data

Oct. 6, 1997 [KR] Rep. of Korea ...................... 97-51198

[51] Int. Cl.$^7$ .............................. G08C 25/00; H04L 1/18
[52] U.S. Cl. ............................................... 714/748; 714/18
[58] Field of Search ................ 714/748, 18, 16, 714/23, 55

[56] References Cited

U.S. PATENT DOCUMENTS 4,841,526  6/1989  Wilson et al. .......................... 714/748
5,664,091  9/1997  Keen ........................................ 714/18

OTHER PUBLICATIONS

Robert M. Sanders and Alfred C. Weaver; The Xpress Transfer Protocol (XTP)–A Tutorial, Oct. 1989; pp. 67–80.
David D. Clark, Mark L. Lambert and Lixia Zhang; NETBLT: A High Throughput Transport Protocol; 1988; pp. 353–359.
David D. Clark, Van Jacobson, John Romkey and Howard Salwen; An Analysis of TCP Processing Overhead; Jun. 1989; pp. 23–29.
Lin et al., TCP Fast Recovery Strategies: Analysis and Improvements, IEEE, pp. 263–271, Apr. 1998.
Kim et al., Behaviors of an Enhanced Transport Protocol fo Multipeer Multimedia Communications, IEEE, pp. 607–612, Jan. 1998.
Gu et al., New Error Recovery Structures for Reliable Multicasting, IEEE, pp. 189–196, Sep. 1997.
Lucas et al., MESH: Distributed Error Recovery for Multimedia Streams in Wide–Area Multicast Networks, IEEE, pp. 1127–1132, Jun. 1997.
Atwood et al., Reliable Multicasting in the Xpress Transport Protocol, IEEE, pp. 202–211, Oct. 1996.
Pejhan et al., Error Control Using Retransmission Schemes in Multicast Transport Protocols for Real–Time Media, IEEE, pp. 413–427, Jun. 1996.
Lin et al., RMTP: A Reliable Multicast Transport Protocol, IEEE, pp. 1414–1424, Mar. 1996.
Grossglauser et al., Optimal Deterministic Timeouts for Reliable Scalable Multicast, IEEE, pp. 1425–1432, Apr. 1998.

*Primary Examiner*—Albert De Cady
*Assistant Examiner*—Shelly A Chase
*Attorney, Agent, or Firm*—Antonelli, Terry, Stout & Kraus, LLP

[57] ABSTRACT

The present invention relates to the error control method in inter-multi-user multimedia communication. There are error detection, error reporting and error recovery functions in the conventional error control method which finds out and solve the error occurring at the time of data transmission between transmitter and receiver, however, these functions are an error control method occurring in end-to-end communication consisting of one transmitter and one receiver and are not appropriate to solving errors occurring concurrently and in a bundle between one or some transmitters and many receivers in many-to-many multiple points inter-multi-user communication such as multimedia communication. Therefore, the present invention uses the damping technique to minimize the number of error control packets of which all the receiver having sensed the error concurrently request the resend based on the NACK.

2 Claims, 5 Drawing Sheets

ERROR CONTROL METHOD FOR MULTIPARTY MULTIMEDIA COMMUNICATIONS

BACKGROUND OF INVENTION

1. Field of the Invention

The present invention relates to an error control method to replace the conventional transport protocol which brings about a bottleneck phenomenon in a communication between computers mutually communicating by accessing a network in comparison with a performance of a network being super-high-speedified and a computing speed of a computer in multimedia computer communication and, in particular, to an error control method for guaranteeing a multiparty reliable data transmission in a transport protocol which supports a many-to-many communication model.

2. Information Disclosure Statement

A recent tendency of persisting the globalization of the world brings many areas in a state and states all over the world close to each other through communication and information processing. These requirements are not simply satisfied through conventional usual mail, telephone and faximile but require a variety of multimedia application services such as group wares which support a group joint work which facilitates a concurrent face-to-face dialogue through application services such as remote lecture, remote medical treatment and remote video conference, etc.

One approach for sharing an application service which persist high speed and diversification is to develop transport protocols for multiple users. However, most of them are 1:1 transport protocol modes which share a single user which supports participating users with only existing user-system interaction. As one of the efforts to solve such problem, the field of communication network and application service highlights the transport protocol as an important research area, and the high speed transport protocol appears to be a new research field for a multimedia application in different machines high speed networks. Existing OSI TP(Transport Protocol) 4 stack or TCP/IP is a protocol provided to transmit a general text data and has many disadvantages in that it is not appropriate to provide a real time communication required in multimedia environment and a communication to reliably process a lot of data. In addition, these protocols are not appropriate for a communication protocol which can satisfy requirements accompanying an increase in a variety of computer communication networks, an increase in transmission rate according to development of communication technology and transmission apparatus, a development of computer technology and an extension of new application service area including a varietymedia. Furthermore, since these protocols were developed in the time when the bandwidth of network was narrow, the network had high error occurrence rate and there was lack of system resources, the main object of the protocols was an efficient use of bandwidth and an efficient performance of error detection and recovery. However, to solve the performance degradation due to the structural problem of the existing protocol, the existing high speed communication environment uses a method of revising or extending the function of existing protocol and minimizing the protocol processing time and a method of designing a new protocol structured to be appropriate to the existing high speed network environment. Since the extension of existing protocol among the methods can not be a long term solution, a research on the design of new protocol is vigorously carried out.

The error control is to reliably provide the data transmission necessary for multimedia application such as collaborative work in inter-multi-user transport protocol environment of multimedia computer communication. Since the existing error control methods have been used mainly for document-oriented text data in the time when the network was unsafe due to jitter and delay, etc., and the performance such as speed was poor, they present too many disadvantages to be used as an error control method required in the super high speed information communication environment based on the existing multimedia and super high speed transmission network.

To guarantee the inter-multi-user reliable data transmission, the reliability of data packet transmission and of group membership of subscriber of communication must be guaranteed. To provide the reliability of this type, the problem of acknowledge implosion and scalability of group membership which does not occur in the protocol based on end-to-end or peer-to-peer communication such as Transmission Control Protocol (TCP) must be considered.

A real conference wants to have the guaranty of strict transmission delay service instead of reliable transmission service. On the other hand, the collaborative application such as common editor or distribution of medical image information absolutely requires the transmission service guaranteeing the reliability. Recently, reliable multicast transmission protocols of various types have been developed to accommodate the requirement of application program requiring the quaranty of reliability, and there are results of research which compares and analyses the protocols, however, such protocols have not efficiently solved the problem of salability of group size and reliability.

In the conventional end-to-end communication in which a transmitter and a receiver establish a 1:1 connection, after the receiver receives the data from the transmitter, the receiver acknowledges the state of the received data according to the method of reliably transmitting and receiving the data. The error control is the function of detecting and solving the errors occurring at the time of data transmission between the transmitters and receivers. The errors that can occur in the procedure of transmission and reception are deformation of packet content, change in the order of packet arrival, duplication of packet arrival and loss of packet, etc. These error control functions are three functions such as error detection, error reporting and error recovery (correction), and the following researches are carried out on them.

The error detection function is to check whether the packets arrive in the order of transmission without deformation of packet contents. The error detection has a procedure of receiving a message by using the information such as sequence number, packet length and data checksum, checking the messages and receiving next message.

The error reporting function is to transfer to the transmission side the informations about the arrival of wrong packet or the loss of packet, and for the error reporting function, a Negative Acknowledge (NACK) mode of selecting the packet to which the error occurred and acknowledging is well known rather than Acknowledge (ACK) mode of acknowledging whenever the packet arrives. In general, since the existing protocol does not have such error exporting function but frequently detects the error based on the arrival or not of packet by using a Positive Acknowledge (PACK) mode in which the receiver securely acknowledges to the transmitter within a predetermined period, if the existing protocol is applied to a many-to-many communication, it causes an overload at the time of data transmission.

The error recovery (correction) function is to recover a reported error by retransmitting the packet corresponding to the reported error. A method of retransmitting all packets after the packet to which the error occurred is used, and the method is easy to implement so that it can be easily applied to a communication network having high error rate, therefore, the method is adopted and used in the existing protocol, however, nowadays a revised method is required in the super high speed network environment in which the reliability of the network is improved and a great amount of data must be transmitted a short time period.

The functions described above is a method of controlling errors occurring in the end-to-end communication composed simply of one transmitter and one receiver and is not appropriate to solve the errors occurring concurrently and in a bundle between one or some transmitters and many receivers in the many-to-many multiple points, multiple user communication such as multimedia environment.

SUMMARY OF THE INVENTION

The object of the present invention is to provide an error control method which can satisfy requirements for various multimedia application services in a multiple points, multiple user communication environment by improving the reliable transmission and reception of data by using error control techniques appropriate to multimedia computer communication environment.

The present invention to accomplish the object described above is characterized in that it comprises the steps of: a first step in which the rereceiver receives the data and heartbeat from the source, analyzes them and checks whether the error occurred to the data reception; a second step in which in case where the error occurred to the data reception as a result of check at first step, the receiver re-receives the data and heartbeat from the source, and in case where the error did not occur, the receiver checks whether it received the data packet outside the sequence number zone; a third step in which in case of having received the data packet inside the sequence number zone, as a result of sheck at second step the receiver shifts to the step for analyzing the data and heartbeat, and in case where the receiver received the data packet outside the sequence number zone, the receiver actuates the error correction mechanism; a fourth step in which in case where the receiver receives any message within the threshold for retransmission request from the source after actuation of said error correction mechanism, the receiver shifts to the step of analyzing the received data and heartbeat, and in case where the receiver did not receive anything, the receiver sends the query message to the multicast group to query the status of source ; and a fifth step in which the source transmits the heartbeat to respond to the query, and in case where there is an error in the data packet received from the source, the receiver shifts to the step of receiving the data and heartbeat from the source, and in case where there is no more error to the data packet, the procedure is terminated.

BRIEF DESCRIPTION OF THE DRAWINGS

The above object, and other features and advantages of the present invention will become more apparent by describing the preferred embodiment thereof with reference to the accompanying drawings, in which.

Similar reference characters refer to similar parts in the several views of the drawings.

DETAILED DESCRIPTION OF THE INVENTION

Figure 1:
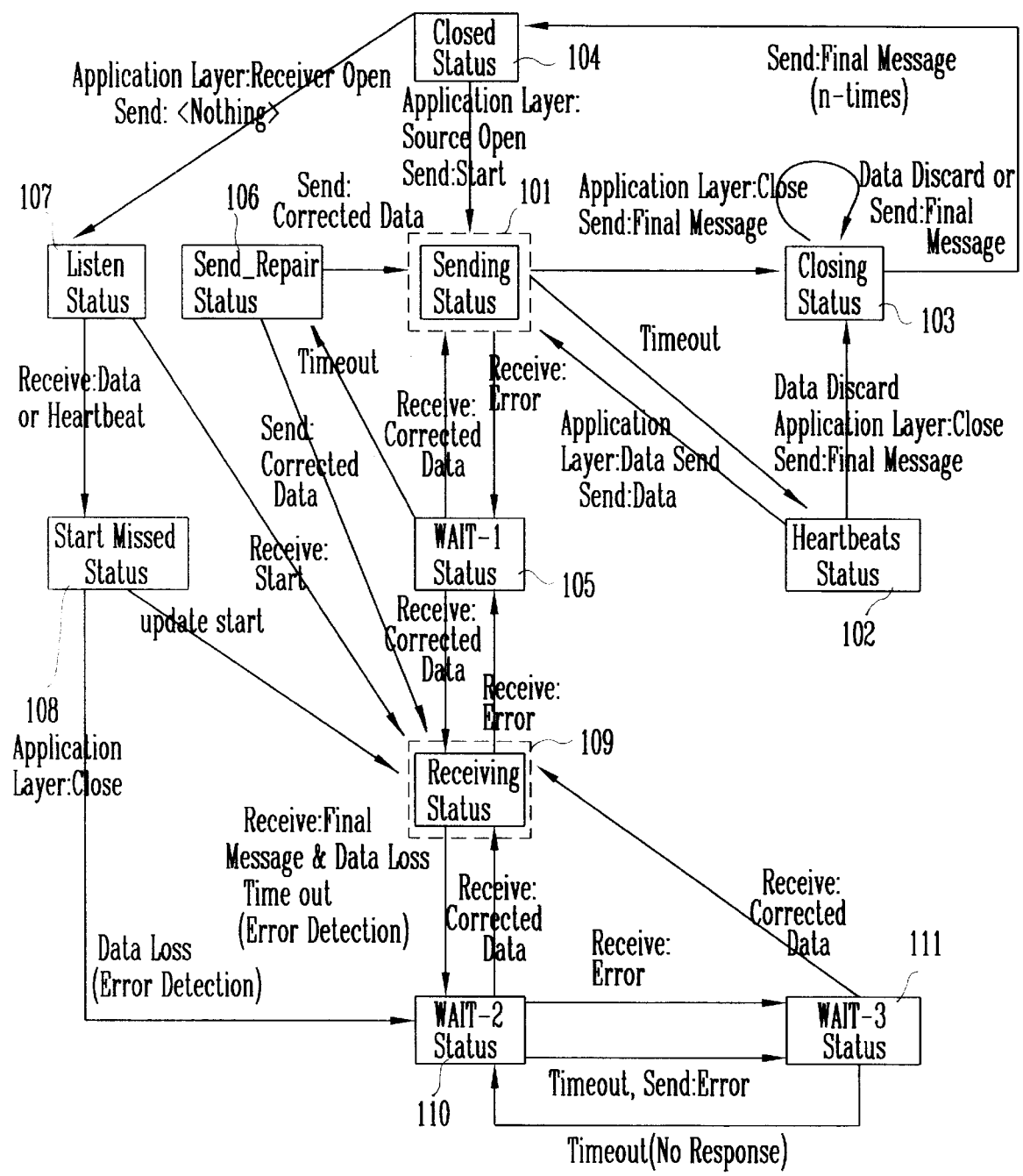
FIG. 1 is a status flow diagram in a transport control according to the present invention.

A communication group is composed of a small number of sources and a large number of receivers which are users participating in the communication, and a connection for communication between them is established to transmit and receive data. During the transmission of data, errors occur due to the loss (this means a damage and a loss) of transmitted message and an abrupt change in environment of system established between two terminals such as a network traffic implosion, failure and system down, and therefore, procedures of detection, correction and recovery of errors are required. In the present invention, these procedures are classified into an error detection mode an error correction mode as follows.

1. Error Detection Mode

For the error detection mode, there are data packet error control method and host system error control method.

A. Data Packet (Message failure) Error Control Method

This method only deals with the error of messages transmitted between sources and receivers. The sources recognize data transmitted and received by using sequence number of messages. The sequence number starts with a number, is sequentially increased for identification of each data packet and is independently maintained by each source. The receiver detects the loss of packet by checking the gap between sequence numbers and finds out the damage of packet by checking the checksum of data packet.

A heartbeat message is used for indication of presence and status of a source host. The heartbeat message which is sent first after the start of communication is transmitted only be the source host and is included in the sequence number of last packet.

The cases in which the heartbeat is generated are as follows. The heartbeat is generated when the source does not send the data, makes the receiver recognize the generation of data loss of source, and represents the time of stop of source and the activity of source. The heartbeat is used when the source is momentarily sloped for a certain period of time. When the source stops the transmission for a certain period, the heartbeat is regularly transmitted until the source normally transmits.

The receiver uses the heartbeat message sent by the source as an indication for responding to an arbitrary request. In the case although the connection between the source and receivers is not interrupted but still established, the source restrains the data transmission due to some reason, then constants such as amount of NACK, flow control parameter and time period taken in a return delivery are calculated after elapse of certain period and before start of heartbeat message.

Most of conference participants transmit small amount of message and, in fact, occasionally transmit during multicast session duration, an at this time the heartbeat transmission time is limited. After the source transmits about 10 messages for a certain period, it declares that it no longer is a source.

The receivers internally refers to a source reference state, and if the receiver fails to obtain the messages and requests the source to improve the status, then the source again repeats the information. The host shifts from the source to the receiver after elapse of certain duration, where the data synchronization of the receiver is the responsibility of the layers of session and application, and the source no more transmits the heartbeat message.

The source maintains all informations on the receivers in the group, and the receiver continues to maintain the information on status of source. The source transmits the heartbeat message by the multicast to maintain the information about the receiver, and the receiver periodically transmits the heartbeat message to the source to inform the source of the last received message. The heartbeat information sent by the receiver can be received only by the source and can not be received by other receivers, and the receiver send the heartbeat to the source by the unicast. The heartbeat includes the receiver ID and a port number of connection and also includes the sequence number of the last message which the receiver received. The source uses the randomized method of periodically selecting only one receiver as a method of avoiding an implosion of heartbeats coming from various receivers.

The source uses the heartbeat sent by the receiver to maintain the trace of status of receiver, collects the status information of the receiver by using the heartbeat received from various other receivers with reduced overhead by using the randomized method, and makes a list of group member on a status table of its own. All the receivers in the group also install a status table about the source by using the first heartbeat message sent by the source. The informations about the status thus obtained are notified to upper layers. The source maintains the state tables which is the base for insuring the reliability on all of the communication such as subscribing procedure, leaving procedure, flow control and error control, etc., If the receiver stops the dialogue, the source informs it to the application layer. If the source once determines that the receiver left, the source removes the receiver form the receiver list and informs the charge to the application layer.

The heartbeat of the source includes the source ID, sequence number of last message and the port number. The receiver uses the sequence number of the first data packet to trace the message sent by the source. The receiver transmits the heartbeat message to the source to the unicast address to respond to the first message is periodically repeated, since there is no secured ACK from the source except the heartbeat. The source sends the heartbeat when there is no data packet to send, and requests the receiver to respond within the heartbeat period.

After the source receives the first data, the use of heartbeat message by the receiver is necessary for providing the reliability to application layer and making a state table to maintain the state of receiver.

In summary, the heartbeat of receiver received by the source is randomized and received by the source to avoid the saturation of network by the heartbeat send by the entire receivers.

The heartbeat of receiver is sent to source by unicast, notifies the last message sent by source, and provides the information with which the source can manage membership of the group of entire receivers.

This heartbeat message is periodically repeated, since there is no secured ACK of source except this heartbeat. The source sends this heartbeat when there is no data packet to send, and requests the receiver to respond within the heartbeat period.

B. Host System (Site failure) Error Control Method

This method is an error control method about the status of source and receivers. In case where the reception of data including the heartbeat message if source is interrupted, the receiver must send a specific message to source to grasp the status of source and it sends the message directly to the multicast group or host. The advantage is that since the multicast tree is used, other hosts can continue to work.

In case where the source can not sense the retransmission request for a certain period, it must be confirmed whether it is due to interrupt from receivers or whether there is no more receiver listening. Therefore, the source transmits the status request to receivers. One of the receivers responds to the status request and if the source multicasts the response to all groups on the multicast address, other receivers cancel their responses. If the source once receives the response to status request, the source can know that at least one receiver exists and continues to receive the data. In case where the source hears no response, it is assumed that the response of receiver is lost or there is no receiver in the group.

To remove the possibility of loss of message, the source must repeat this status request several times before making a decision that there is no receiver in the group.

When the source recovers from the site failure, a resynchronization is required since the source has a new sequence number and the receiver has an old decency number. If the source sends a new START message having the new sequence number the receiver receives the new START message. And forcingly performs the resynchronization. At the time of data transmission, the source makes all receivers receive the START message by repeating the START three times. The receivers checks the START message of a header, and when the START message is lost, the receivers inform the source with NACK that the error has occurred.

2. Error Correction Mode

The transport protocol detects and corrects the error occurring during the data transmission to guarantee the reliability. This guarantees the reliable data delivery to each participant, and each receiver anticipates and is responsible for the loss and damage of data.

If the source hears nothing from the receiver, it decides that there is no abnormality in reception of data by the receiver. If the connection of receiver is interrupted, although the source has a method of retransmission, the source can not take any action for error correction. A countermeasure against this is that the receiver reestablishes a connectivity to the group and retransmits the data. Since the source recognizes the loss of data only when the receiver requests the lost data, the receiver is solely responsible for the error detection.

If the receiver finds out and confirm the damage of one or more data among the message, it can request the retransmission of necessary data and here the NACK is used for that. NACK is transmitted through IP-Multicast group, and other host notices the request and prevents the transmission for the same request by using the damping technique.

In case where the source can not retransmit, other host retransmits the data. The host capable of retransmission shall have sufficient buffers for data to carry our the retransmission process.

The source has a large buffer to satisfy the data retransmission requirement, and the data is removed from the buffer if once the data is discarded. Since the buffer is used for new data, the discarded data can no longer be kept in the buffer. This structure is a model used as an example since the buffer management is not determined.

The use of damping technique reduces the possibility of message implosion occurring when many receivers concurrently respond, the receiver immediately transmits the NACK at the time of detection of lost data to reduce the implosion, and other receivers listen to the NACK. In case where the receiver senses the NACK (retransmission request), the receiver does not hade to send the NACK of its own. However, if the local receiver did not receive other NACK or the supplement of lost data is not sufficient, the local receiver have the necessity of sending the NACK. If all receivers have to wait for same period, the damping technique has no meaning. In general, the time spacings for which the receivers wait are different. Each receiver calculates the random time value for listening before carrying out the retransmission request. The advantage of damping technique is that it reduces the repetition and limits the saturation of packet of source and network.

The partial loss or damage of data occurs at the time of data transmission processing. The receiver requests the retransmission of them, and one of source and peer-hosts retransmits them. When the source does not transmit data for a certain period, it transmits the heartbeat message instead.

Two models for data retransmission is a method in which the source is responsible for retransmission and a method in which all hosts are responsible for retransmission. The former is a method in which the source responds to all retransmission requests and if the source can not retransmit for some reason, the peer-hosts take charge of retransmission.

The latter is a method in which the hosts (including the source itself) listen to the source and take charge of retransmission.

There are two solutions for the excessive retransmission responses. In the first method, the retransmission response is carried out by the source itself, and although it is simple, the host takes charge of responding to the retransmission request and the peer host does not respond. However, this method must be selectively used. For example, if the source host is overloaded with other works, the retransmission delivery in time is impossible, and therefore, the method must be selectively used.

In the second method, the retransmission response is carried by the agent of the source, and the retransmission processing is slow, and in case where the source has a problem of connectivity, the retransmission response of peer hosts is delayed. The advantage in case where all hosts have potential retransmission points is that the processing for reduction of overload of source is possible. This method can give the efficiency to other host (dealing with response) which is capable of fast response. There is no method for other host which is overloaded. The host carries out the retransmission in case where the source is more overloaded than the host.

In case of using a model in which the source is given a priority, the requirement for the retransmission is satisfied even in a case where the source has no room for retransmission. In case where other host retransmits instead of the source due to the overload, the host must be a receiver of the source data to perform the function and the host can respond to the retransmit request in the same way as the source host.

The source can not avoid the response to the retransmission of data, it responds to the retransmission. In case where the source can not respond to the retransmission request, the peer host responds. In some cases, the peer host can better deal with the retransmission request than the source and decide the sufficient time for response to the retransmission request on behalf of the source. This can be performed by using a timer or a specific number for the retransmission request.

The peer hosts can prevent by using the damping technique a lot of response to the requests occurring even after the retransmission of requested data. All peer-hosts trying to respond to the retransmission request wait for a certain period for listening to respond to the request from other host.

In a case where the source or receiver uses a method other than a predetermined procedure due to a special situation, if the receiver does not receive a retransmission after ten times of attempt nor hear a heartbeat from the source in that time period, the receiver decides that the source host is no longer available, that is, the receiver considers that the source has already left the group. Both of the case where the receiver does not know the status of the source which left the group and the case where the connection to the source is lost are a case where there is no peer-receiver to satisfy the retransmission request or the peer-receivers do not have the required data. At this time, the transport protocol notifies the error occurrence to the application layer. The application layer considers this and decides next operation according to the situation of application layer. The receiver does not note the leave of the source. That is, the receiver is set to regularly receive data or heartbeat.

In case where the receiver does not receive any message from the source for a predetermined period, the receiver decides the status of the source. This is important since the receiver updates the moment it listens to the source for the last. At that time, the receiver does not know whether the source transmitted other data.

The receiver obtains the status of source through an explicit request. If, although the source is still in the multicast group, it is a receiver, then the previous source host notifies that it is no longer a source.

The previous source can no longer keep the last segment of data so that it sends the last lacked with a sequence number to the source. This makes the receiver decide the loss of data or not, If the receiver notifies this to the application layer, the processing by the source shift is completed when the data of source is no longer valid, and the data is discarded by all receivers.

In case where the source is no longer in the multicase group (when it left), the receivers (status requesters) respond to the peer-hosts since the receivers consider that the peer-hosts still keep the information about the source.

The receiver having the data and heartbeat of the source can not request the termination of retransmission. This is because of a network error that the path to the source return to the receiver itself In this case, the peer-receiver can perform the retransmission on behalf of the source. If there is no peer-receiver listening to the retransmission request, the receiver terminates the error state and notifies this to the application layer.

Being different from a 3-way handshake method in which the reansmitter of conventional transport protocol requests a connection to the receiver, the receiver receives an indication of connection and respond to the transmitter, the error control method according to the present invention is a method in which a source and a plurality of receivers participate in a cession according to a predetermined rule. In that method, The present invention will be described below in detail with reference to the accompanying drawings.

FIG. 1 is a status flow diagram inside the transport protocol to which the present invention is applied, wherein the change in the statuses of connection, leave, error control and data transmission between transmitters and receivers is illustrated.

A CLOSED status 104 is a step before all sources and receivers start communication from an application layer.

A SENDING status 101 is a status in which if the source receives a source open command form the application layer, the source substantially transmits data after transmitting a START packet to the receivers.

A WAIT-1 status 105 is a status in which the sources and receivers in SENDING status 101 or RECEIVING status 109 respond to error request. When the host such as source or receiver receives an error message, it returns to the WAIT-1 status 105, responds to the error message and provides recovered correction data. The WAIT-1 status 105 is used in damping with which the peer host responds to error message. The host generates correction data, operates the timer and waits checking whether other peer-host responds to correction data, and if no other peer-host transmits within the waiting tamer period, the host moves to a SEND-REPAIR status 106 and then transmits correction data to the multicast group. However, in case where other peer-host responds to correction data, the host returns to the original SENDING status 101 or RECEIVING status 109.

In WAIT-2 status 110, the receiver detects the damage of packet by checking the checksum value of packet and detects the lost packet by tracing the packet sequence number, and if the receiver knows that although a data was transmitted, it was not received, then the receiver invokes the timer. The receiver moves to the WAIT-2 status 110 after the end of timer. In this status, the receiver detects the error and sends the NACK to the mulitcast group. If the receiver is waiting in this status for damping for reducing the number of NACKs, other host in the multicase group listens to the NACKs. If the timer is exhausted in WAIT-2 status 110, the receiver generates error message, sends it to the multicast group and moves to WAIT-3 state 111. If there is no response to error message from other host (source or other receiver), the receiver returns to WAIT-2 status 110 and generates error message again. This back-and-forth shift between WAIT-2 status 110 and WAIT-3 status 111 is performed only five times. If there is no progress after five timers are exhansted, the host assumes that there has occurred an abnormality to the connection establishment between the source and receiver and notifies to the application layer that error occurred.

If other host detects error, the receiver in WAIT-2 status 110 moves to WAIT-3 status 111, waits for response to error message and moves to normal RECEIVING status 109 when it receives the correction data.

In case where there is an error to the data packet which the receiver receives from the source or in case where the receiver does not receive the data packet, the source searches the data having the sequence number form the data stored in the buffer of its own and retransmits the data packet relevant to the receiver before the timer attached to the data packet is exhausted thereby recovering the data packet.

In a CLOSING state 103, if the source shifts from the SENDING status 101 to HEARTBEATS status 102 and a given time is elapsed, the source sends to the receiver six heartbeat messages according to the timer and notifies to the receiver the intention that it no longer sends the data packet and then changes to the position of receiver or to a state of terminating the communication.

In the HEARTBEATS status 102, the source sends the heartbeat instead of data to inform the receivers of the status of source in the idle status in which the source momentarily stop the data transmission according to the status of application layer after the source sends the data packet.

The RECEIVING status 109 is a status in which the receiver receives an open command from the application layer and shifts to a LISTEN status 107, and thereafter the receiver substantially receives the data packet.

The LISTEN status 107 is a status in which if the receiver receives the open command from the application layer, the transport protocol of the receiver side prepares for receiving the START packer from the source.

A START MISSED status 108 is a case in which the receiver does not receive the START packet send by the source in the LISTEN status 107, wherein the receiver is treated as a normal join status in case it receives the START packet and is treated as a Late Join status.

Figure 2:
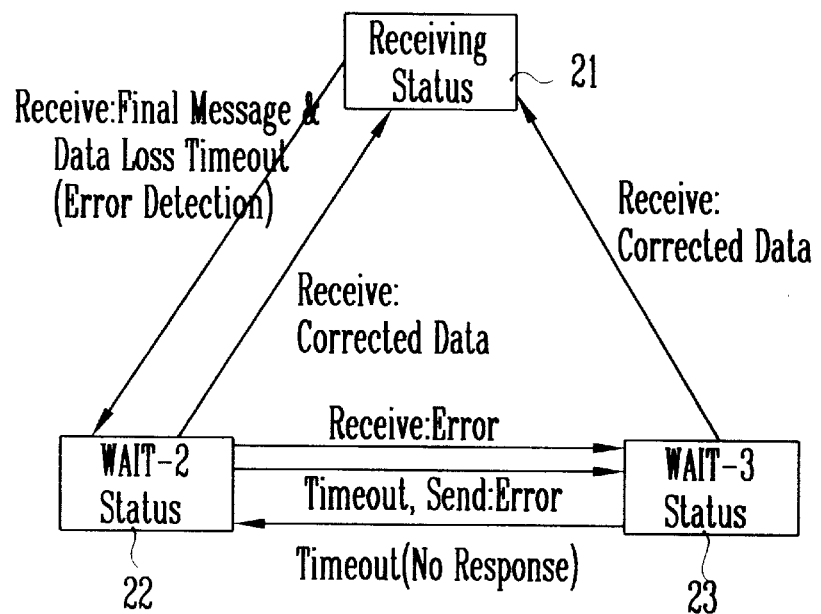
FIG. 2 is a status flow diagram for error detection and retransmission request according to the present invention.

FIG. 2 is a status process diagram of error detection and retransmission request according to the present invention. In the RECEIVING status 21, the receiver traces the sequence number, detects the error occurring in the message delivery procedure, and invokes the timer necessary for recovery period. Here, the object of detection is the received data.

The receiver moves to WAIT-2 status 22 after the termination of timer. In this status, the receiver detects the error and sends the NACK to multicast group. If the receiver waits in this status for damping which reduces the number of NACK, other host in multicast group listens to the NACKs.

If other host already detected the error, the receiver moves to WAIT-3 status 23, waits for response to error message, and moves to a normal RECEIVING state 21 in case of receiving the correction data.

If the timer is exhausted in WAIT-2 status 22, the receiver generates the error message, sends it to multicast group and moves to WAIT-3 status 23. If there is no response to error message from other host (source or other receiver), the receiver returns to WAIT-2 status 22 and generates the error message again. This back-and-forth shift between WAIT-2 status 22 and WAIT-3 status 23 is performed only ten times. If there is no progress after ten timers are terminated, the host decides that a serious obstruction occurred to the connection establishment between source and receiver and notifies the error condition to application layer.

Figure 3:
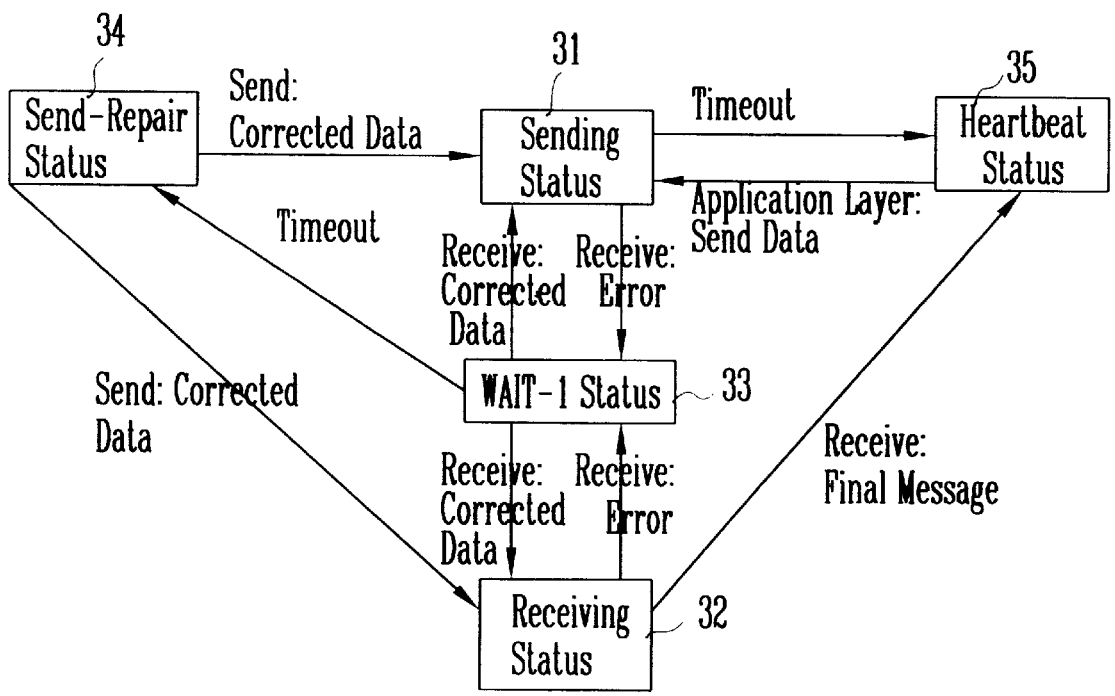
FIG. 3 is a status flow diagram for error correction according to the present invention.

FIG. 3 is a status transition diagram for error correction according to the present invention. The host in SENDING status 31 or RECEIVING state 32 respond to the error request via other peer-host. In case of receiving error message, the host enters the WAIT-1 status 33, responds to the error message and provides the correct correction data. The peer host uses the WAIT-1 status 33 in damping for responding to the error message. The host generates the correction data and operates the timer, and thereafter, if the timer period for which the host waits to the whether other host responds to the correction data is over, the host moves to SEND REPAIR status 34 and sends the correction data to the multicast group. However, In case where other peer-host responded to the correction data, the host returns to the original SENDING status 31 or RECEIVING status 32.

The heartbeat message is used in indicating the presence and status of the source host, The heartbeat message which is sent first is sent only by the source host and is included in the sequence number of the last packet.

The heartbeat is generated in the idle status in which an idea exchange is interrupted for a while during a conference in the application layer or the source does not send the data, and the heartbeat makes the receiver recognize the intention that the source does not send the data and indicates the stop time and activity status, etc. When the source stops sending for a certain period, it regularly sends the heartbeat until it normally sends the data. In case where the source does not send the data, the time taken for bask-and-forth delivery of the amount of NACK, flow control parameter and constants is calculated after the elapse of certain time.

The receiver also regularly sends the heartbeat message to the source so as to inform the source of the final message which the receiver received. The heartbeat information sent by the receiver can be requested only by the source but not by other receiver, and the receiver send the heartbeat to the source by the unicast. The heartbeat includes the receiver ID and the port number of connection, and also the sequence number of the final message which the receiver received. The source uses the randomized method of periodically selecting one receiver as a method of avoiding the implosion of the heartbeat coming from various receivers.

Figure 4:
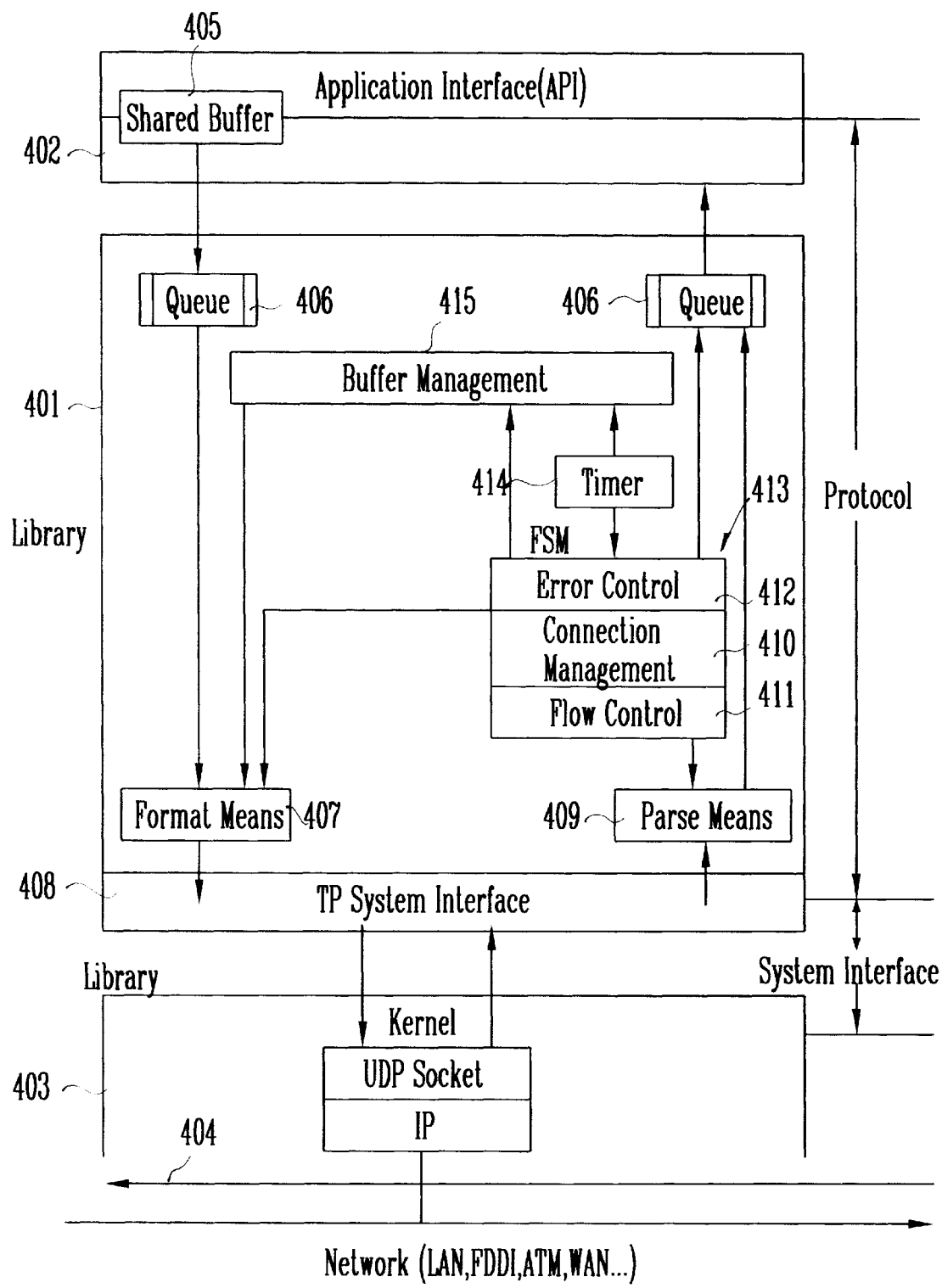
FIG. 4 is a structural drawing of the upper and lower portions of protocol in a multimedia communication system to which the present invention is applied.

FIG. 4 shows a condition in which the transport protocol is loaded inside the system, wherein the portion which takes charge of flow control in a status processor in which the transport protocol exists is shown.

As shown in the drawing, the transport protocol 401 is situated in the center, the upper side of the transport protocol 401 is connected to an application interface (API) 402 and the lower side of the transport protocol 401 is connected to a network 404.

The application layer constitutes a queue list by using a shared buffer 405 to communicate with API 402 and transmits the constituted queue list to a queue 406 of the protocol 401.

The protocol perform the communication procedure by using the status processor, and a format means 407 formats the data packet to be transmitted and sends it to a Transport Protocol (TP) system interface 408. The formatted data packet of the TP system interface 408 is sent to the network 404 through the kernel 403. The formatted data packet send to the network side 404 is sent to various receivers. The receiver side is constructed in such a way that it resolves the formatted data packet at a parse means 409, performs a procedure according to status process such as a connection management means 410, flow control means 411, error control means 412, timers 414 and a buffer management means 415 inside the protocol if the resolved data packet is sent up to the upper level transport protocol, and makes a queue list and transmits it to the application layer through the queue 406. The connection management means 410, flow control means 411 and error control means 412 constitute a finite state machine 413.

As a procedure of previous step for connection establishment, the API which connects the application layer to the inside of protocol is performed in three procedures.

The initialization of protocol brings the multicast address and port number from the application layer to initialize the protocol. The application layer provides a unique ID to confirm the source. The order of read and write uses a shared buffer between an application layer and API to exchange the data. The API write procedure copies the data from the application layer buffer to the buffer of transport protocol. The flow control method has many relations with the timer and buffering.

Figure 5:
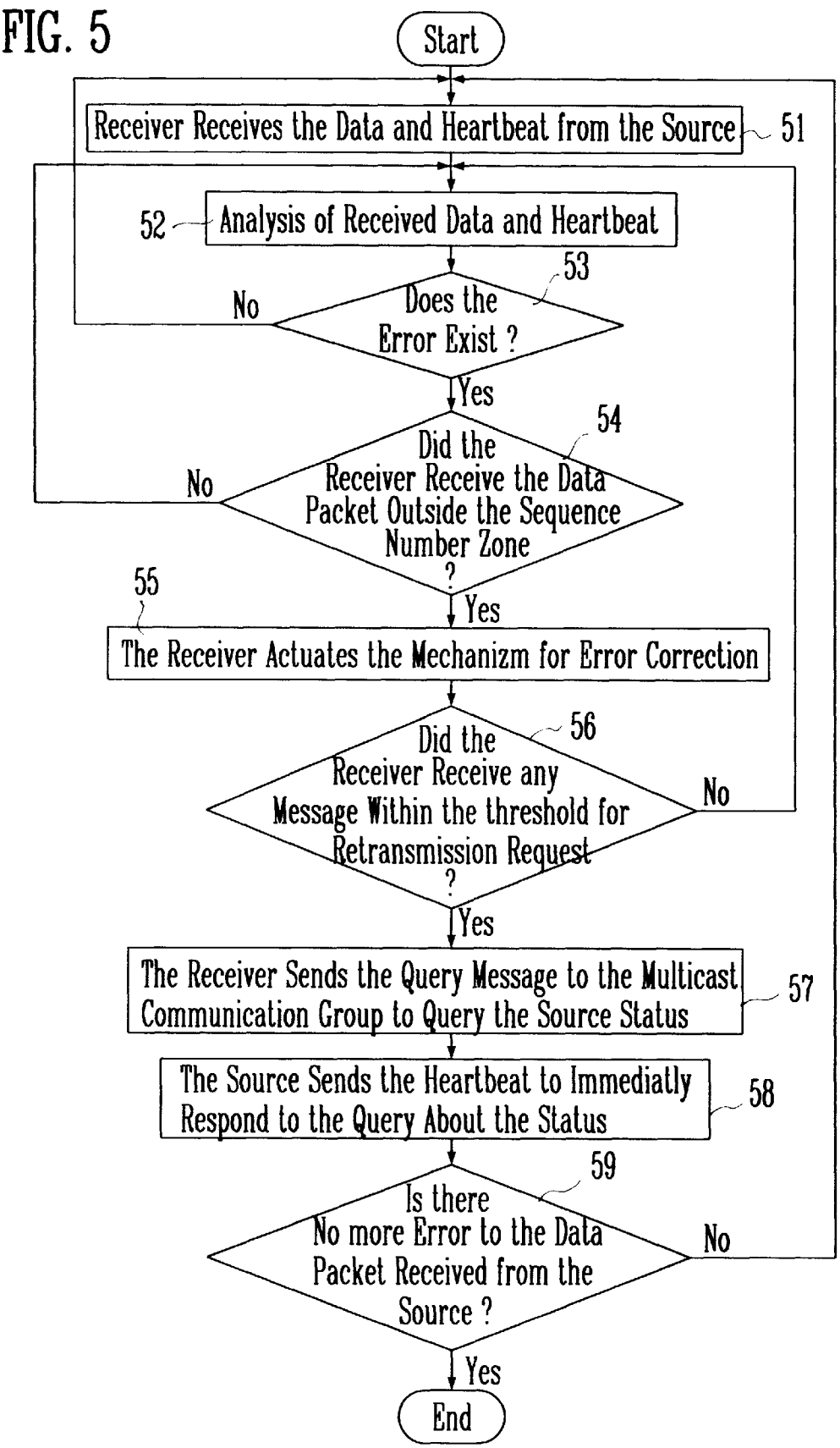
FIG. 5 is a process flow diagram of error detection and retransmission request according to the present invention.

FIG. 5 is a process flow diagram for error detection and retransmission request according to the present invention, and is a drawing which integrates the partial illustration of FIG. 1 through 3.

The receiver receives 51 the data and heartbeat from the source, analyzes 52 them and decides 53 whether the error occurred to the data reception. In case where the error occurred to the data reception, the receiver re-receives the data and heartbeat from the source, and in case where the error did not occur, the receiver checks 54 whether it received the data packet outside the whether it received the data packet outside the sequence number zone. In case of having received the data packet inside the sequence number zone, the receiver shifts to the step 52 for analyzing the data and heartbeat. In case where the receiver received the data packet outside the sequence number zone, the receiver actuates 55 the error correction mechanism for correcting the error. In case where the receiver receives 56 any message within the threshold for retransmission request from the source, the receiver shifts to the step 52 of analyzing the received data heartbeat, and in case where the receiver did not receive 56 anything, the receiver sends the query message to the multicast group to query 57 the status of source. The source transmits the heartbeat to immediately respond 58 to the query about the status. In case there is an error in the data packet received from the source, the receiver shifts to step 51, and in case where there is no more error to the data packet, the procedure is terminated.

Figure 6:
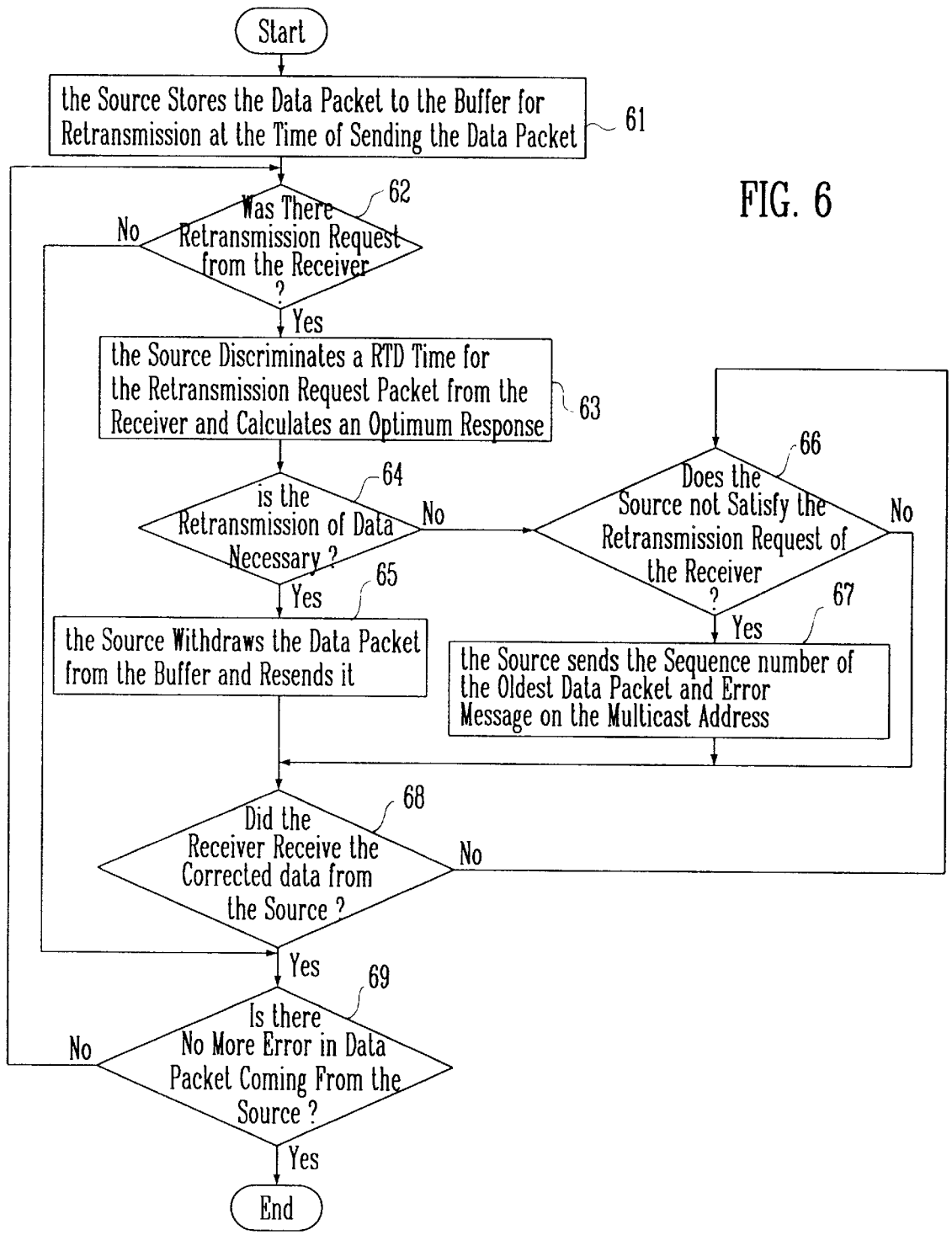
FIG. 6 is a process flow diagram of error correction according to the present invention.

FIG. 6 is a process flow diagram for error correction according to the present invention and is to illustrate in detail the step 55 in FIG. 5.

The presently embodied protocol is designed in such a way that only the source responds to the retransmission. The source stores 61 the packet to its own buffer for retransmission at the time of sending the data packet. After discarding the data, the buffer manger discards the data from the buffer.

It is checked 62 whether there was retransmission request from the receiver, and in case where there is retransmission request, the source discriminates a round trip delay (RTD) time for the retransmission request packet from the receiver and calculates 63 an optimum response to the request of the receiver. In case where there is no retransmission request as a result of checking at step 62, the source proceeds to step 69. The source discriminates 64 whether the retransmission of data is necessary, and when the source retransmits the data, the source withdraws 65 the data packet from the buffer and resends it. The error correction method is go-back-N method. Therefore, all incidentital data packets are withdrawn from the buffer and resent. As a result of the step 64, if the data is not retransmitted, it is checked 66 whether the source can not satisfy the retransmission request of the receiver. If the source does not satisfy the retransmission request of the receiver, the source sends 67 the sequence number of the oldest data packet and error message on the multicast address.

In case that the retransmission request is satisfied at step 65 and 66, after performing the step 67, it is checked 68 whether the receiver received the corrected data from the source by using the retransmission. In case where the receiver did not receive the corrected data from the source, the procedure shifts to the step 66, and in case where the receiver received the corrected data, it is checked 69 whether there is no error to the data packet received from the source. In case where there is an error to the data packet, the procedure shifts to the step 62, and if there is no error, the procedure is terminated.

As described above, the present invention is an error control method for transmitting the multimedia data between multiple points and multiple users with high reliability and can be used in various application fields.

As described above, the algorithm according to the present invention can be used in the transport protocol of computer communication so as to not only facilitate the reliable multimedia data transmission between multiple users but also minimize the loss of data.

What is claimed is:

1. An error control method in inter-multi-user multimedia communication comprising the steps of:

a first step in which the receiver receives the data and heartbeat from the source, analyzes them and checks whether the error occurred to the data reception;

a second step in which in case where the error occurred to the data reception as a result of check at first step, the receiver re-receives the data and heartbeat from the source, and in case where the error did not occur, the receiver checks whether it received the data packet outside the sequence number zone;

a third step in which in case of having received the data packet inside the sequence number zone, as a result of check at second step the receiver shifts to the step for analyzing the data and heartbeat, and in case where the receiver received the data packet outside the sequence number zone, the receiver actuates the error correction mechanism;

a fourth step in which in case where the receiver receives any message within the threshold for retransmission request from the source after actuation of said error correction mechanism, the receiver shifts to the step of analyzing the received data and heartbeat, and in case where the receiver did not receive anything, the receiver sends the query message to the multicast group to query the status of source; and a fifth step in which the source transmits the heartbeat to respond to the query, and in case where there is an error in the data packet received from the source, the receiver shifts to the step of receiving the data and heartbeat from the source, and in case where there is no more error to the data packet, the procedure in terminated.

2. The error control method in inter-multi-user multimedia communication as claimed in claim 1, wherein the error control mechanism of the third step comprises the steps of;

a step in which the source stores the data packet to its own buffer at the time of sending the data packet and checks whether there is retransmission request from the receiver;

a step in which in case where there is retransmission request from the receiver as a result of check whether there was the retransmission request, the source discriminates a round trip delay time for the retransmission request packet from the receiver, calculates on optimum response and discriminates whether the retransmission of data is necessary;

a step in which the source which decided to retransmit the data as a result of discrimination of whether the retransmission of the data is necessary withdraws the data packet from the buffer and remends it;

a step in which the source which decided not to retransmit the data as a result of discrimination of whether the retransmission of the data is necessary checks whether the source satisfy the retransmission request of the receiver;

a step in which of the source satisfy the retransmission request of the receiver as a result of check whether the source satisfies the retransmission request, the source sends the sequence number of the oldest data packer and error message on the multicast address;

a step in which in case where the source satisfies the retransmission request of the receiver after the source withdraws the data packet and remends it, it is checked whether the receiver received the corrected data after sending the error message;

a step in which in case where the receiver did not receive the corrected data from the source as a result of check whether the receiver received the corrected data from the source, the procedure shifts to the step of checking whether the source satisfies the retransmission request of the receiver; and a step in which in case where the receiver received the corrected data from the source as a result of check whether the receiver received the corrected data from the source, it is checked whether there is no error to the data packet received from the source, and in case where there is an error to the data packet, the procedure shifts to the step in which it is checked whether there is the retransmission request from the receiver, and if there is no error, the procedure is terminated.

* * * * *